(12) United States Patent
Hashimoto

(10) Patent No.: US 6,789,035 B1
(45) Date of Patent: Sep. 7, 2004

(54) METHOD OF ANALYZING VIBRATION IN A TRANSMISSION BELT AND AN APPARATUS AND PROGRAM USEABLE TO PERFORM THE METHOD

(75) Inventor: Yasuhiro Hashimoto, Miki (JP)

(73) Assignee: Mitsuboshi Belting, Ltd. (JP)

( * ) Notice: Subject to any disclaimer, the term of this patent is extended or adjusted under 35 U.S.C. 154(b) by 0 days.

(21) Appl. No.: 10/452,028

(22) Filed: May 30, 2003

(30) Foreign Application Priority Data

May 30, 2002 (JP) ........................ 2002-156604

(51) Int. Cl.[7] .................. G01L 25/00; G06F 19/00
(52) U.S. Cl. ................................................. 702/105
(58) Field of Search ................... 702/105, 85, 108, 702/113; 474/101, 109, 110, 111; 73/862.194, 762.391, 862.41

(56) References Cited

U.S. PATENT DOCUMENTS

| | | | | |
|---|---|---|---|---|
| 4,983,145 A | * | 1/1991 | Hirai et al. ................. | 474/117 |
| 5,435,191 A | * | 7/1995 | Kawachi ..................... | 73/862.41 |
| 5,733,214 A | * | 3/1998 | Shiki et al. .................. | 474/69 |
| 5,877,431 A | * | 3/1999 | Hirano ........................ | 73/862.41 |
| 6,547,692 B1 | * | 4/2003 | Ries-Mueller et al. ...... | 477/45 |

FOREIGN PATENT DOCUMENTS

| | | | | |
|---|---|---|---|---|
| JP | 2000-130048 | | 4/2000 | |
| JP | 2001066011 | * | 3/2001 | ............. G01L/5/10 |

* cited by examiner

Primary Examiner—John Barlow
Assistant Examiner—Demetrius Pretlow
(74) Attorney, Agent, or Firm—Wood, Phillips, Katz, Clark & Mortimer

(57) ABSTRACT

A method of analyzing vibration in a longitudinal direction of a transmission belt that is trained around at least a drive pulley and a driven pulley in a power transmission system. The method includes the steps of using a vibration analysis model which involves a) generating data relative to the power transmission system; and b) calculating belt tension values, including a selected belt tension value, using the generated data. In the event that the selected belt tension value is calculated to be at or lower than a predetermined belt tension value, a correction is made in the selected belt tension value. The corrected, selected, calculated belt tension value is used to carry out the vibration analysis.

19 Claims, 8 Drawing Sheets

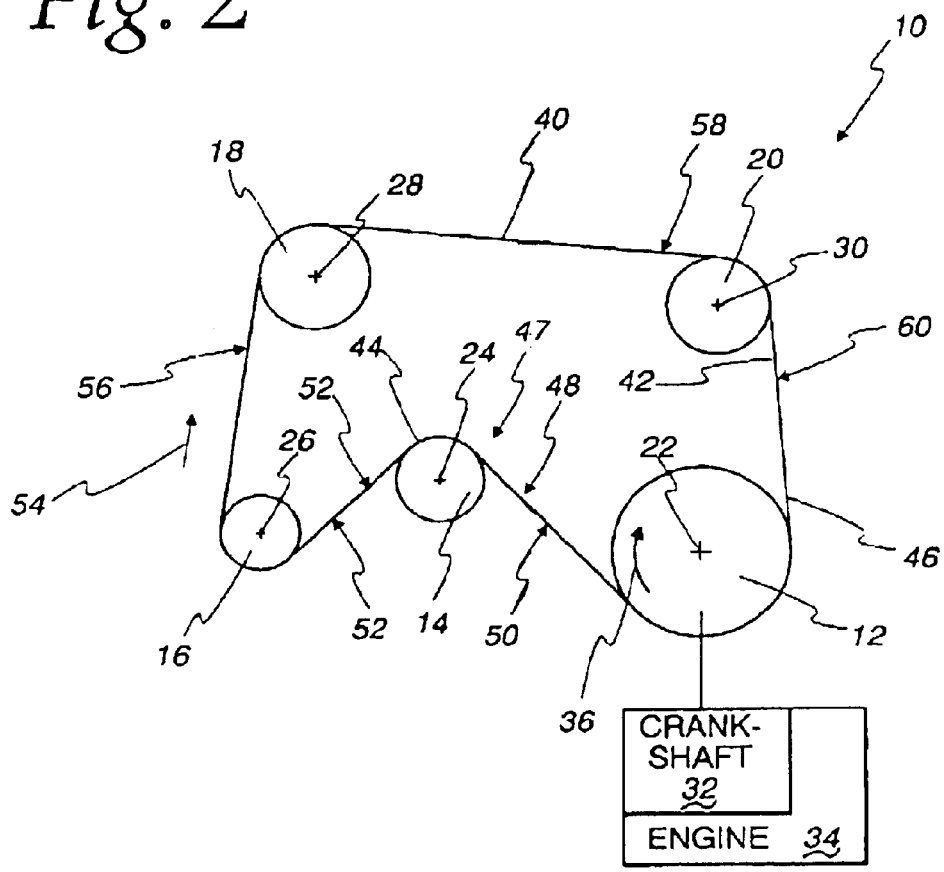
Fig. 2
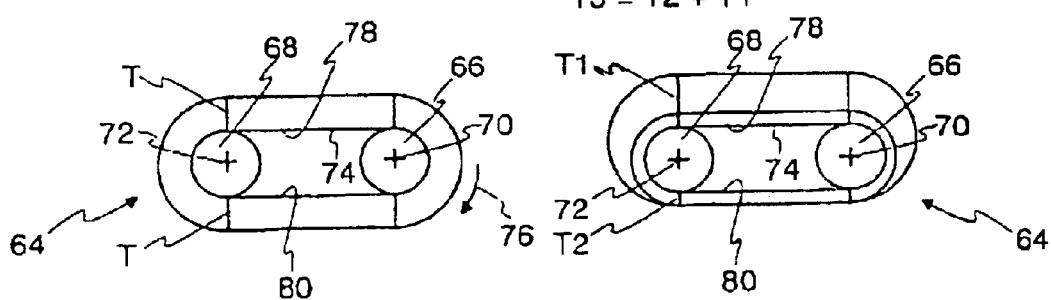
Fig. 3
Fig. 4
T3 = T2 + T1

L=199
PULLEY DIAMETER = 120MM

L=284
PULLEY DIAMETER = 120MM

METHOD OF ANALYZING VIBRATION IN A TRANSMISSION BELT AND AN APPARATUS AND PROGRAM USEABLE TO PERFORM THE METHOD

BACKGROUND OF THE INVENTION

1. Field of the Invention

This invention relates to analysis of vibration in a transmission belt. More particularly, the invention is directed to a method, an apparatus, and a program for performing the vibration analysis using a vibration analysis model.

2. Background Art

It is known to perform vibration analysis for a power transmission system utilizing a vibration analysis model. The vibration analysis may facilitate system design that accounts for a long operating life for the transmission belt, taking into account load, belt tension, number of pulley revolutions, belt velocity, diameter of the pulleys, layout of pulleys, and the like.

One exemplary, conventional, vibration analysis method is disclosed in JP-A-2001-311456. In this system, a belt on a pulley is divided into nodes of relatively minute length. The nodes are coupled with elastic elements or rigid elements. The vibration analysis is conducted by observing the belt and pulley as they come into contact with, and separate from, each other. Likewise, with the vibration analysis model, the belt element is divided into nodes of relatively minute length.

In the above conventional vibration analysis method, using a vibration analysis model, compression distortion may cause the arithmetic calculation of a simulated span tension to be negative, i.e. in a compressed state. However, given that a transmission belt is a pliant, continuous beam, and the fact that experimentation shows that the belt between spans is maintained in an elliptical state, it is not possible for an actual span of the belt to have a negative tension. Thus, in the vibration analysis model, using this conventional vibration analysis method, the span tension is determined by calculating using a spring constant reduced to or fixed at zero, or is determined by making calculations with a spring element removed. However, this determination is carried out in the abstract, with there being no concrete basis for making a correction in this manner.

Another vibration analysis method is disclosed in JP-A-2001-311456. A belt element is divided into nodes of minute length. In this particular method, the vibration analysis model is quite complicated. Generation of a program to perform the arithmetic calculations to conduct the analysis may be complicated and potentially time consuming.

SUMMARY OF THE INVENTION

In one form, the invention is directed to a method of analyzing vibration in a longitudinal direction of a transmission belt that is trained around at least a drive pulley and a driven pulley in a power transmission system. The method includes the steps of using a vibration analysis model which involves: a) generating data relative to the power transmission system; and b) calculating belt tension values, including a selected belt tension value, using the generated data. In the event that the selected belt tension value is calculated to be at or lower than a predetermined belt tension value, a correction is made in the selected belt tension value. The corrected, selected, calculated belt tension value is used to carry out the vibration analysis.

The step of using a vibration analysis model may involve modeling belt portions between each of the drive and the driven pulleys, and a pulley adjacent to each of the drive and driven pulleys, using a Voigt model to calculate a belt tension value to be used with the Voigt model from a formula including an harmonic function simulating revolutions of a crankshaft for the drive pulley.

The step of making a correction may involve making a correction using an expression of a curvilinear relation which does not become zero.

In one form, the step of making a correction involves making a correction using an expression of a curvilinear relation associated by an exponential function.

The step of making a correction may involve making a correction using the following expression:

$$T' = T_{sp} \times \exp((T/T_{sp}) - 1)$$

where: T is the selected calculated belt tension value;
$T_{sp}$ is the predetermined belt tension value; and
T' is the corrected selected calculated belt tension value.

The step of calculating the selected belt tension value may involve calculating the selected belt tension value in a belt portion in which there is compression distortion.

The invention is further directed to an apparatus for analyzing vibration in a longitudinal direction of a transmission belt that is trained around at least a drive pulley and a driven pulley in a power transmission system. The apparatus includes a first structure for receiving data relative to the power transmission system and, through the data, preparing a vibration analysis using a vibration analysis model. The first structure is capable of calculating belt tension values, including a selected belt tension value. The first structure is further capable of making a correction in the selected calculated belt tension value used in preparing the vibration analysis in the event that the selected calculated belt tension value is at or lower than the predetermined belt tension value.

The first structure may be capable of modeling belt portions between each of the drive and driven pulleys, and a pulley adjacent to each of the drive and driving pulleys, using a Voigt model to calculate a belt tension value, to be used with the Voigt model, from a formula including an harmonic function simulating revolution of a crankshaft for the drive pulley.

The first structure may be capable of making a correction using an expression of a curvilinear relation which does not become zero.

The correction may be made using an expression of a curvilinear relation associated by an exponential function.

The correction may be made by using the following expression.

$$T'T_{sp} \times \exp((T/T_{sp}) - 1)$$

where: T is the calculated selected belt tension value;
$T_{sp}$ is the predetermined belt tension value; and
T' is the corrected calculated selected belt tension value.

In one form, the first structure is capable of calculating the selected belt tension value at a belt portion at which there is compression distortion.

The invention is further directed to a program for use with a computer to permit analysis of vibration in a longitudinal direction of a transmission belt that is trained around at least a drive pulley and a driven pulley in a power transmission system. The program, when loaded in a computer, causes the computer to process data relative to the power transmission system and thereby prepare a vibration analysis using a vibration analysis model. The program causes the computer to calculate belt tension values including a selected belt tension value and further to make a correction in the selected calculated belt tension value used in preparing the vibration analysis in the event that the selected calculated belt tension value is at or lower than a predetermined belt tension value.

The program may cause the computer to model belt portions between each of the drive and driven pulleys and a pulley adjacent to each of the drive and driven pulleys using a Voigt model to calculate a belt tension value to be applied to the Voigt model from a formula including an harmonic function simulating revolution of a crankshaft for the drive pulley.

The program may cause the computer to make a correction using an expression of a curvilinear relation which does not become zero.

The program may cause the computer to make a correction using an expression of a curvilinear relation associated by an exponential function.

The program may cause the computer to make a correction using the following expression.

$$T' = T_{sp} \times \exp((T/T_{sp}) - 1)$$

where: T is the selected calculated belt tension value;

$T_{sp}$ is the predetermined belt tension value; and

T' is the corrected calculated selected belt tension value.

The program may cause the computer to calculate the selected belt tension value at a belt portion at which there is compression distortion.

The program may be provided in combination with a computer into which the program is loaded.

BRIEF DESCRIPTION OF THE DRAWINGS

FIG. 2 is a schematic representation of a power transmission system with which vibration analysis, according to the present invention, can be made;

FIGS. 3–6 are schematic representations of a power transmission system during a phenomenon in which a calculated span tension of the belt used in the system falls to zero during operation;

DETAILED DESCRIPTION OF THE DRAWINGS

Figure 1A:
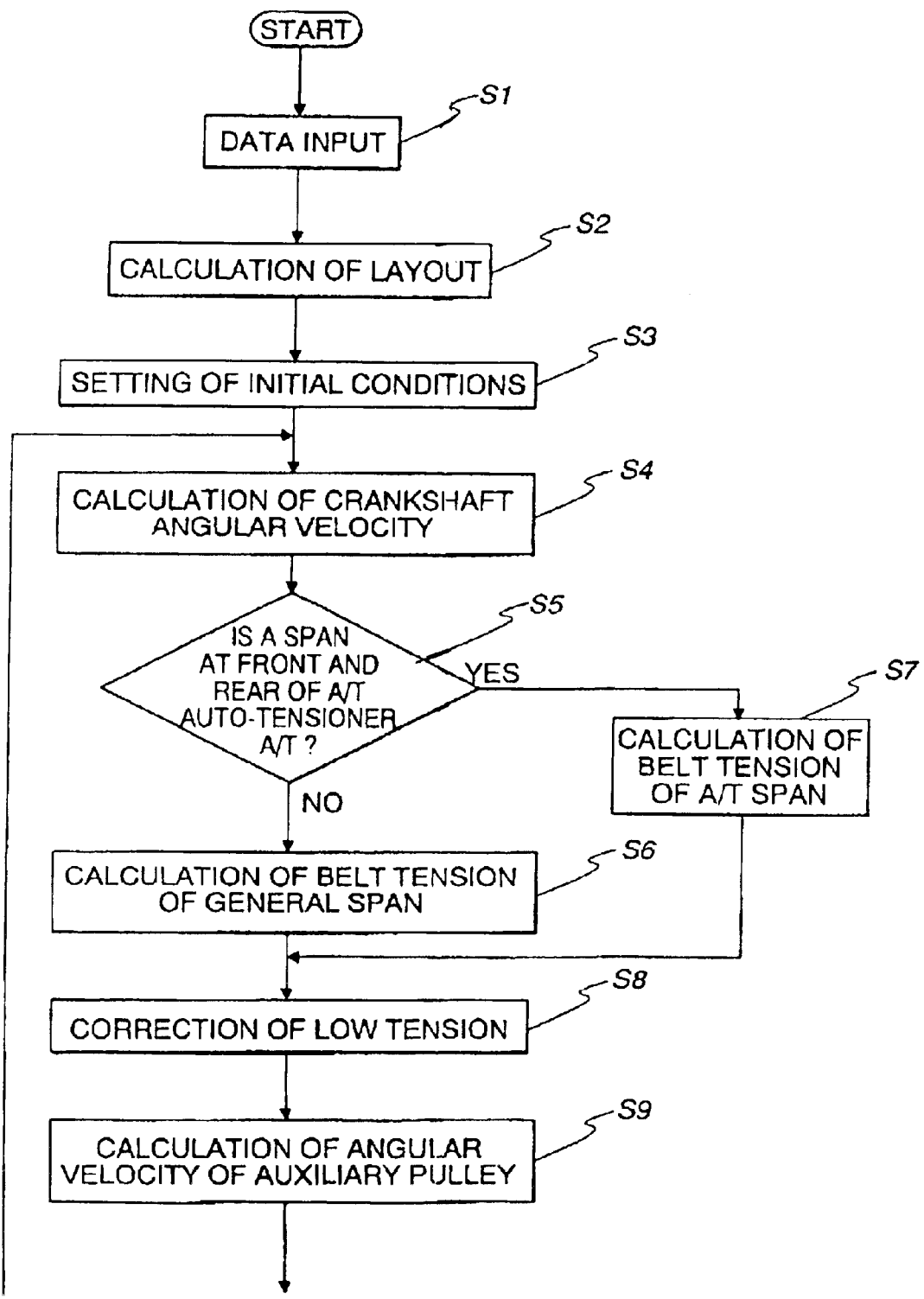
FIG. 1 is a flow chart showing a vibration analysis method for a power transmission system, according to one embodiment of the invention.

One exemplary power transmission system, with which the present invention can be practiced, is shown at 10 in FIG. 2. The power transmission system 10 has five pulleys 12, 14, 16, 18, 20, consecutively driven around spaced, parallel axes 22, 24, 26, 28 30. The pulley 12 is a crank pulley which is in the form of a V-ribbed pulley functioning as a drive pulley. The crank/drive pulley 12 is attached to a crankshaft 32 on an engine 34 for rotation with the crankshaft 32 in the direction of the arrow 36. The crankshaft 32 and crank/drive pulley 12 rotate with a predetermined speed variation dictated by the crankshaft 32.

The pulley 16 is a V-ribbed pulley functioning as a driven/auxiliary pulley and is arranged in spaced relationship with the pulley 14, with the axis 26 of the driven/auxiliary pulley 16 below the axis 24 of the pulley 14. The pulley 18 (pulley i) is a V-ribbed pulley also functioning as a driven/auxiliary pulley and is spaced above the driven/auxiliary pulley 16 a substantial distance. The pulley 20 (pulley N) is a V-ribbed pulley which functions as a driven/auxiliary pulley and is arranged above the crank/drive pulley 12 and spaced vertically therefrom a substantial distance.

An endless transmission belt 40 is trained around the crank/drive pulley 12 and the driven/auxiliary pulleys 16, 18, 20 with the inside surface 42 of the transmission belt 40 in contact with each of the pulleys 12, 16, 18, 20. The transmission belt 40 has a V-ribbed construction with a plurality of parallel ribs (not shown) on the inside surface 42 engaged with the pulleys 12, 16, 18, 20.

The pulley 14 is a tension pulley with a flat outer surface 44 to engage the outside surface 46 of the transmission belt 40. The axis 24 of the tension pulley 14 resides above the axis 22 of the crank/drive pulley 12. The tension pulley 14 functions as a dry-type auto-tensioner at 47, which is constantly pressed on a belt span 48 between the crank/drive pulley 12 and driven/auxiliary pulley 16, so that a belt span 50 is defined between the crank/drive pulley 12 and tension pulley 14 and a separate belt span 52 is defined between the driven/auxiliary pulley 16 and the tension pulley 14. The belt span 48 is defined in a slackened region of the transmission belt 40 which is advanced in a clockwise direction, as indicated by the arrow 54. The tension pulley 14 exerts a force on the transmission belt 40 to automatically adjust belt tension. Three additional separate belt spans 56, 58, 60 are defined on the power transmission system 10. The span 56 resides between the driven/auxiliary pulleys 16, 18. The span 58 resides between the driven/auxiliary pulleys 18, 20. The span 60 resides between the driven/auxiliary pulley 20 and the crank/drive pulley 12.

Figures 1, 1A, 1B:
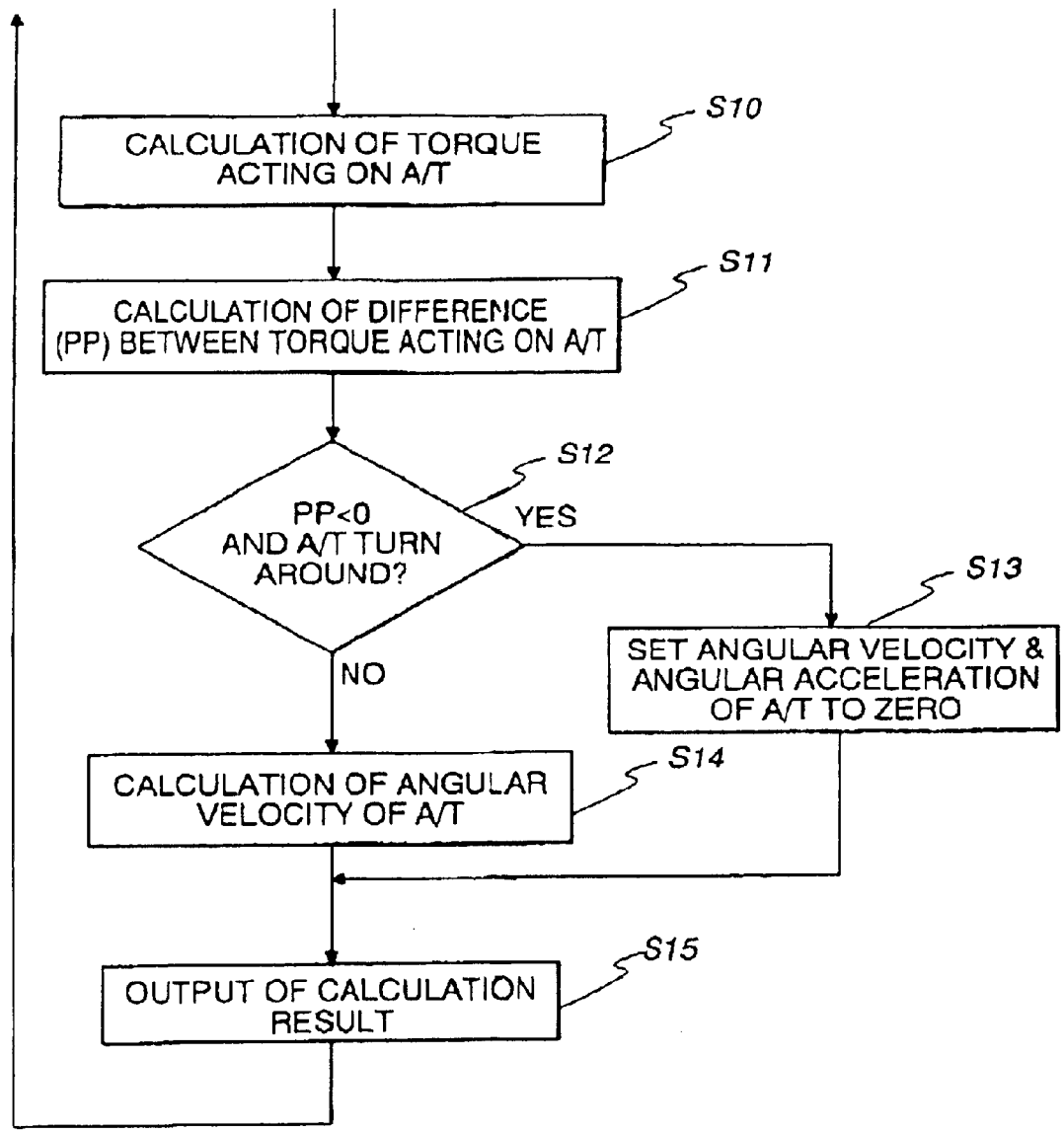

Referring now to FIG. 1, a method of analyzing vibration in a longitudinal direction of the transmission belt 40, in the power transmission system 10, will now be described. FIG. 1 is a flowchart relating to the power transmission system 10. In step S1, data is input. From this input step, conditions for a vibration analysis model are input after which related calculations are carried out. The conditions are: the number of pulleys (N), in this embodiment five; the presence or absence of an auto-tensioner, which in this embodiment is present; the characteristic of an alternator pulley, such as the presence or absence of a unidirectional clutch structure, which in this embodiment is absent; coordinates, diameters, moment of inertia, regular torque of each pulley (12, 14, 16, 18, 20); dimension and characteristics of an auto-tensioner, which in this case is present; and characteristics of the revolution of each pulley.

In step S2, a calculation of a reference layout (layout of pulleys at the time of initial tension) is made. The following calculations are made: the x and y coordinates of the auto-tensioner 47; contact angle; length of transmission belt; each span length (reference span length); tension at a reference time; and slip factor for each pulley.

The reference span length around the auto-tensioner 47 is determined as described below. A length determined by totaling a span length in the front and rear (length of tangent) of the tension pulley 14, winding length on the tension pulley 14, and one-half of the added winding length of two pulleys adjacent in the front and rear is defined as the reference span length around the auto-tensioner 47 at the time of initial tension.

In step S3, initial conditions are set.

In step S4, the angular velocity of the crank/drive pulley 12 is determined. Since the speed characteristics of a crankshaft depend on an engine with which it is associated, a velocity waveform obtained by actual machine measurement is subjected to Fourier transformations to set the crankshaft angular velocity as a function of time, as shown below.

$$\omega_1 = \omega_0 \times \left\{ 1 + \sum_{i=1}^{4} A_i \sin(i\lambda t + \delta_i) \right\} z$$

where: $\omega_1$=instantaneous crankshaft angular velocity at time t;

$\omega_0$=crankshaft average angular velocity;

$A_i$=single amplitude rate of variation of revolution (i-th order high-frequency component);

$\lambda$=each frequency of variation of revolution (assumed as $\lambda=2\omega_0$ with four cylinders); and $\delta_i$=phase of an i-th order high-frequency component of a crankshaft angular velocity.

In step S5, it is determined whether or not the span is a span at the front and rear of the auto-tensioner 47. If the span is not at the front and rear of the auto-tensioner (step S5: NO) in step S6, calculation of a general span tension is carried out. If the span is at the front and the rear of the auto-ensioner (step S5: YES), in step S7, the calculation of the span tension of the auto-tensioner 47 is carried out.

The span in the front and rear of the auto-tensioner 47 means the spans 50, 52, adjacent to the tension pulley 14 on the auto-tensioner 47. The "general span" means the span 56, 58, 60, excluding the span 48 at the front and rear of the auto-tensioner 47.

In this process, the travel simulation for the transmission belt may result in calculations of the span tensions that become negative (−). In actuality, the tension never becomes negative. According to the invention, the span tension of the belt is corrected, as described below.

In FIGS. 3–6, a simple power transmission system is shown at 64 consisting of a drive pulley 66 and a driven pulley 68. The pulleys 66, 68 are driven in rotation around parallel axes 70, 72, respectively. A transmission belt 74 is trained around the pulleys 66, 68.

With no load applied, and the drive pulley 66 rotated in the direction of the arrow 76 in FIG. 3, a substantially uniform tension T is developed in separate spans 78, 80, and throughout the entire remainder of the transmission belt 74. The tension T is shown in diagrammatical form upon the belt 74 in FIG. 3.

In FIG. 4, with a load applied, the tension T1 in the belt span 78 increases from the tension T, with the tension T2 in the belt span 80 decreasing from the tension T. In these models, T1+T2 equals T3 and T3+T2 equals two times T.

Figure 5:
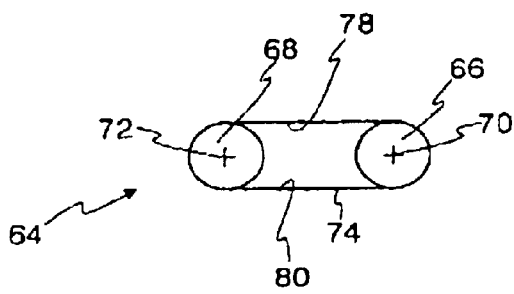
Figure 6:
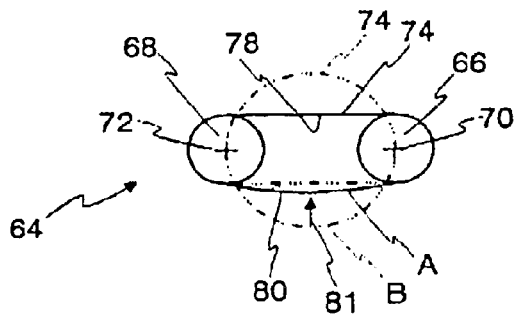
Figure 7:
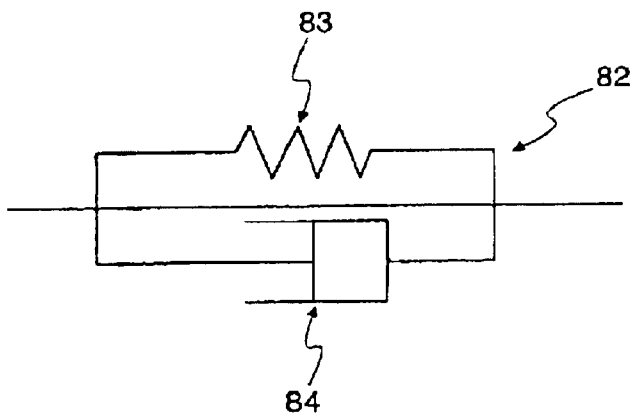
FIG. 7 is a schematic representation of a Voigt model.
Figure 8:
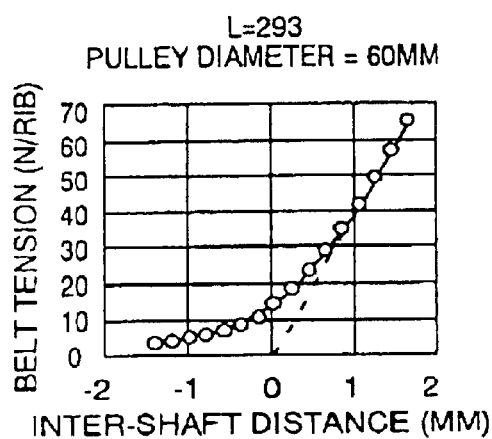
FIGS. 8–11 are graphs showing results of experimentation of tension at low tension in a dynamic power transmission system, as shown in FIGS. 3–6.
Figure 9:
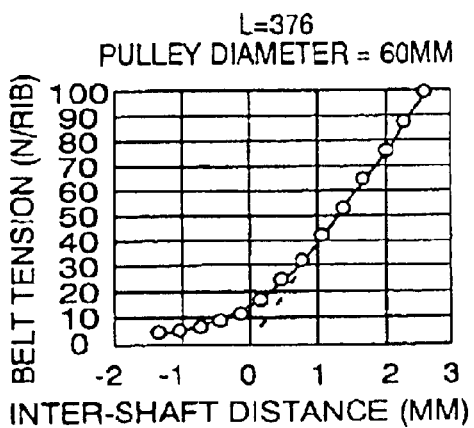
Figure 10:
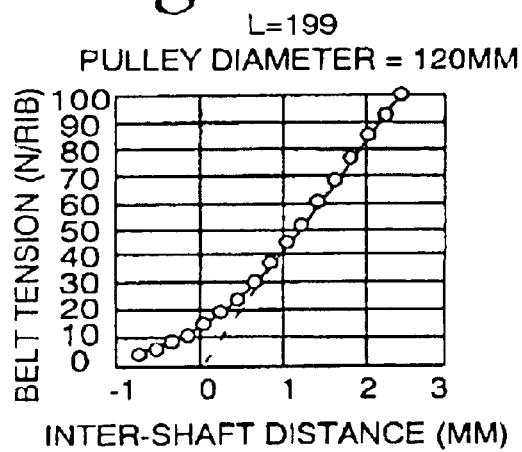
Figure 11:
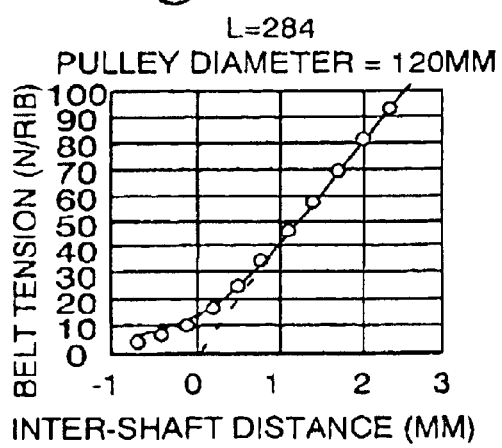

Further increasing of the load essentially causes the tension in the span 80 to decrease to nearly zero. In this low tension region, residual forces in the belt 74 cause the belt 74 to expand to an elliptical shape, as shown at A in FIG. 6 for the span 80, rather than maintaining the flat state for the span 81, as shown in FIG. 5. In the state shown at A, the transmission belt 74 has a state different than the ring shape at B in FIG. 6, which the transmission belt 74 naturally assumes with the internal stresses on the belt 74 relieved. To assume the shape shown at A, it is necessary for an external force to be applied in the direction of the arrow 81 to overcome the forces internally of the belt. The external force at 81, for deforming the belt from the ring shape at B into the elliptical shape at A, is called an external force opposing a bending stress of the belt. Although this external force is described as a span tension, in the vibration analysis method with this embodiment, the angular velocity of the driven pulley shaft varies with respect to the angular velocity input (harmony function input) to the driven pulley. Thus, variation of angular velocities of a pair of pulleys adjacent to each other changes to a force displacement input to determine a belt tension (span tension) for the span. The span tension is calculated using a Voigt model, as shown at 82 in FIG. 7, for each span of the belt. The Voigt model has a spring element 83 and a damping element 84. The spring constant ($K_i$) for the spring element 83 is equal to $AE/LL_i$. The damping constant ($C_i$) for the damping element is equal to $C/LL_i$.

In step S6, the general span tension is calculated. The general span tension is calculated from a travel distance and a velocity of the belt by solving a differential equation of the Runge-Kutta-GiL, which is discussed later. The tension in the belt span 60 in the power transmission system 10 is calculated by finding a fixed point on the crank pulley using the crankshaft angular velocity found in step S4. More specifically, the span tension is calculated according to the following equation.

$$T_i = T_0 + K_i(U_{i+1} - U_i) + C_i(V_{i+1} - V_i)$$

with: $K_i = AE/LL_i$; and $C_i = C/LL_i$ and where:

$T_i$=span tension;

$T_0$=initial tension (reference tension—tension when an auto-tensioner is in the reference position);

$K_i$=spring constant of a belt in a span i;

$C_i$=damping constant of a belt in the span i;

$U_i$=belt travel distance on a pulley i;

$V_i$=belt velocity on the pulley i;

AE=longitudinal modulus of elasticity of the belt;

$LL_i$=one half a pulley winding portion in a length of a span i; and

C=damping coefficient of the belt.

In step S7, a span tension for the auto-tensioner 47 is calculated. To determine the span tension for the auto-tensioner 47, coordinates of the tension pulley 14 are calculated from an arm angle of the auto-tensioner 47. A contact angle between the transmission belt 40 and tension pulley 14 is determined. A length increment of the span in the front and rear of the auto-tensioner 47 is calculated from the contact angle. From the above calculation, the span tension of the auto-tensioner 47 can be determined from the belt velocity, belt travel distance, and the length increment.

More specifically, the span tension is calculated according to the following equation.

$$T_i = T_0 - K_i(U_{i+1} - U_i + \Delta L) + C_i(V_{i+1} - V_i)$$

where: $\Delta L$=increment of a span length in the part following movement of the auto-tensioner.

In steps S6 or S7, since a tension is usually calculated according to an elasticity curve represented by a linear relation, the calculated span tension may become negative if the transmission belt is in a compressed state. Therefore, in step S8, a correction of the span tension in the low tension region is made. More specifically, in the case in which the span tension $C_i$, calculated in steps 6 or 7, is smaller than a predetermined belt tension value $T_{sp}$, the span tension is corrected according to the following equation.

$$T_i = T_{sp} \times \exp[T_i/T_{sp} - 1]$$

where: $T_i$=span tension; and
$T_{sp}$=reference tension for making correction at low tension region.

The above equation for correcting the span tension was found, as described below. An experiment was carried out using a V-ribbed belt with four ribs of different lengths and attaching the belt to two dynamic testing machines consisting of two shafts with drive and driven pulleys having diameters of 60 mm and 120 mm, respectively.

With the assumption of no load, an experiment was conducted where inter-shaft distance was sequentially changed during revolution at 2,000 rpm to find a relationship between the inter-shaft distance and an inter-shaft force. The amount of movement of a moving side bearing box were measured by a dial gauge as the inter-shaft distance and the inter-shaft force were measured by a load cell. The results are shown in FIGS. 8–11.

In FIGS. 8–11, the y-axis values were found by dividing a measured inter-shaft force by two and further dividing it by the number of ribs and converting a quotient into a belt tension per rib. The x-axis shows a variation amount of an inter-shaft distance. A linear portion of experimental data was extrapolated and at a point where the belt tension crossed zero, the x-axis was assumed to be zero. The circles in the figures show the experimental data, with the solid lines representing correction curves, as discussed below.

In all four experiments, it can be seen that the belt tension begins to deviate from the straight line at 36N/rib or less. The point at which the belt tension started to deviate was assumed to be $T_{sp}$, with the correction required at this or a lesser belt tension. Although different expressions might be used for this correction, a method of approximating the belt tension with a simple exponential function expression will be described below.

Figure 12:
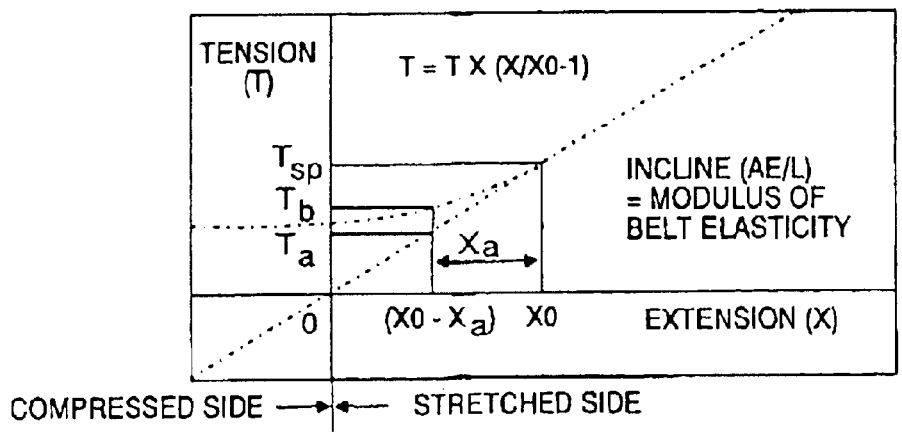
FIG. 12 is a graph depicting an expression for correction of span tension, according to the present invention.

As shown in FIGS. 12, the expression for calculating a tension using an extension (X) is changed from a proportional expression according to a modulus of elasticity (AE/L) to an exponential function. Assuming that A is a cross-sectional area, E is a modulus of elasticity, and L is a reference length, the following relationship is established from a relation of stress/tension and distortion/extension in FIG. 12. W0, $T_{sp}$ and AE/L are constants determined depending upon given conditions/experimental data.

$$T_{sp} = (AE/L) \times X0$$

$$T_{sp} - Ta = (AE/L) \times Xa$$

When these expressions are manipulated, the following expressions are obtained.

$$X0 - Xa = Ta \times (L/AE) \quad \text{(Expression 1)}$$

$$X0 = T_{sp} \times (L/AE) \quad \text{(Expression 2)}$$

When the tension T at the time when extension X=(X0−Xa) is calculated from the expression $T = T_{sp} \times \exp((X0-Xa)/X0 - 1)$ and expressions 1 and 2, the following expression is obtained:

$$T = T_{sp} \times \exp(Ta/T_{sp} - 1)$$

and the above-mentioned expression for correcting the span tension is derived.

In step S9, the angular velocities of the tension pulley 14 and driven/auxiliary pulleys 16, 18, 20 are determined. The angular velocities and velocities are calculated using a moment of inertia for each auxiliary machine, a regular torque applied to the auxiliary pulleys, a solution of the differential equation of the Runge-Kutta-Gil, and the following expression.

From $(T_i - T_{i-1}) \times R_i = II_i \times \omega_i + TQ_i$ $$\omega_i = ((T_i - T_{i-1}) \times R_i - TQ_i)/II_i$$

where: $\omega_i$=angular velocity of a pulley i;
$R_i$=radius of the pulley i (i=1 to N);
$II_i$=inertial moment of the pulley i; and
$TQ_i$=regular torque of an auxiliary machine of the pulley i
(i=1 to N).

In step S10, the torque applied to an arm of the auto-tensioner 47 is calculated. The torque applied to the arm of the auto-tensioner 47 from the belt tension can be determined from a geometric relationship between the magnitude in a direction of a load applied to the tension pulley 14 by the transmission belt 40, the length of the arm of the auto-tensioner 47, the arm angle, and the like.

In step S11, a difference (PP) between the torque applied to the auto-tensioner 47 and the torque is calculated. PP is calculated according to the following expressions.

$$P = K_0 + K \times \phi - BQ$$

$$PP = P - AQ$$

where: P=total torque at the time when there is not friction in the auto-tensioner;
$K_0$=pressing torque of the auto-tensioner;
K=a spring constant (torque gradient) of the auto-tensioner;
$\phi$=position (angle) of the auto-tensioner;
BQ=torque applied to the auto-tensioner; and
AQ=damping (frictional) torque of the auto-tensioner.

In step S12, it is determined whether or not PP is less than zero (the frictional torque is larger) and whether or not the auto-tensioner angle of velocity has been reversed, i.e. whether or not there is a moment when the auto-tensioner 47 has stopped. If it is determined that there is a moment when the auto-tensioner 7 has stopped (step S12: YES), in step S13, the angular velocity and angular acceleration of the auto-tensioner 47 are set to zero. If it is determined that there is no moment when the auto-tensioner 47 has stopped (step S12: NO), in step S14, an angular velocity of the auto-tensioner 47 is calculated. The angular velocity is calculated according to the following.

In the case $P<AQ$, $\delta\phi/\delta t=0$, $\delta^2\phi/\delta t^2=0$

In the case $P<AQ$, $\delta\phi/\delta t \neq 0$, and $P>AQ$ $$\delta^2\phi/\delta t^2 = \{P - AQ/II_{AT}\} \times \text{signum}(P)$$

where: $II_{AT}$=inertial moment of the auto-tensioner.
Angular velocities of the pulleys and an arm angular velocity of the auto-tensioner are found from the angular accelerations of the tension pulley 14 and driven/auxiliary pulleys 16, 18, 20 and the angular acceleration of the auto-tensioner 47, calculated as described above. In step S15, the calculated results for the span tension, arm angle and pulley movement angle, as vibration analysis results, are outputted. When these calculation results are outputted, the method returns to step S4 and repeats the above mentioned steps at an interval of time (H) to perform a vibration analysis.

At the conclusion of the simulation, arithmetic operation of the vibration analysis is determined by checking a convergence state for each revolution ($2\pi/\lambda$). For example, it is determined according to the extent to which a most slackened side tension Ts (span tension of span 50) has converged compared with a calculated value for the immediately preceding period ($2\pi/\lambda$). That is, it is determined that the calculation has converged at the point that a difference of the most slackened side span tension (Ts(t)–Ts (t–$2\pi/\lambda$)) has become |Ts(t)–Ts (t–$2\pi/\lambda$)|<$\alpha$ (reference value), and the arithmetic simulation operation is finished. Thereafter, required time series calculation data is outputted as a graph or a table.

The steps S1–S15 shown in FIG. 2 are carried out by, for example, general purpose personal computer. The personal computer may have hardware such as a CPU, ROM, RAM, a drive for a hard disk, an FD, or CD. On the hard disk, various kinds of software, including the program, may be downloaded. It is also possible to install the program on various computers by recording it on a removable recording medium, such as a CD ROM, an FD, or a MO. The computer and the program software are combined to perform the above mentioned steps S1–S15.

Figure 13:
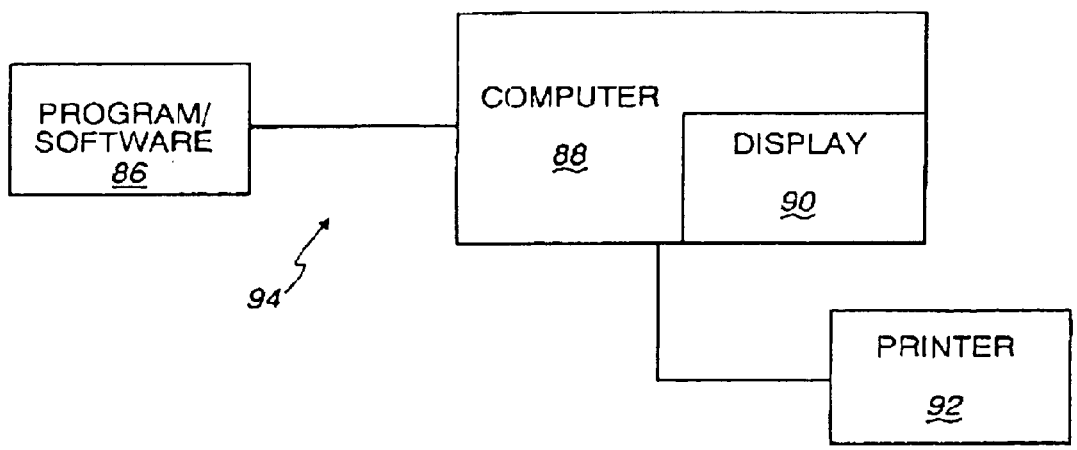
FIG. 13 is a schematic representation of a computer system with a vibration analysis program, according to the present invention.

In FIG. 13, a generic system is shown for practicing the method consisting of a program/software 86 which is loaded on a computer 88. The data obtained in steps S1-S15 for the vibration analysis method may be produced on a display 90 and/or printed on a printer 92, whereby an operator of the vibration analysis apparatus, shown at 94 in FIG. 13, may physically see the data.

According to the invention, including the apparatus, the program, and method, when the general span tension T is calculated in step S6, or the span tension T of the auto-tensioner is calculated in step S7, and the span tension T is equal to or lower than the predetermined tension $T_{sp}$, the span tension is corrected according to the expression $T'=T_{sp} \times \exp((T/T_{xp})-1)$ using an exponential function which attenuates as the tension becomes smaller but does not reach zero in step S9. Accordingly, an effective and accurate vibration analysis can be performed.

In the power transmission system 10, since the number of (N) of the pulleys 12, 14, 16, 18, 20 in the Voigt model is five, the vibration analysis is simplified. Therefore, programming/calculations can be carried out easily and accurately and the time for arithmetic calculations using a program effectively controlled.

The invention is not limited to the embodiment described above. For example, while the power transmission system 10 incorporates an auto-tensioner 47, the present invention can be practiced without the use of an auto-tensioner.

Additionally, the invention can be used in a power transmission belt drive system other than the power transmission system 10 described above.

Further, correction of the span tension is not limited to the exponential function expression in the above embodiment. Various other expressions can be used as long as they are expressions of a curvilinear relation which attenuates as tension becomes smaller but does not reach zero.

Figure 14:
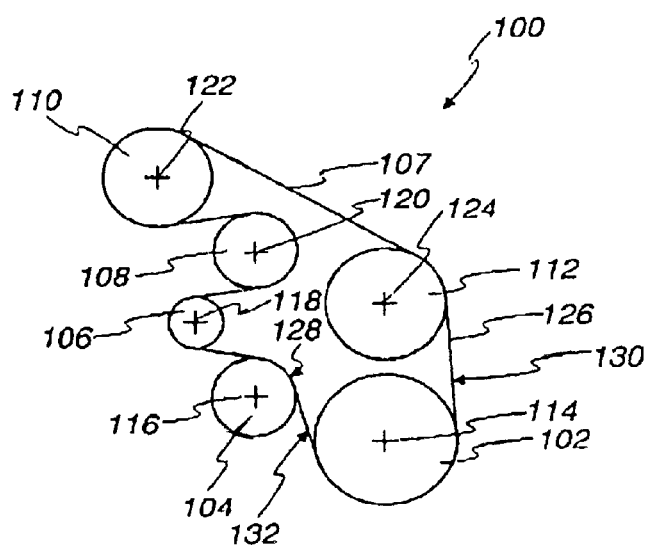
FIG. 14 is a schematic representation of another form of power transmission system, with which the present invention can be practiced.

In FIG. 14, another power transmission system is shown at 100 with which the present invention can be practiced. The power transmission system 100 has six pulleys (N): a crank pulley ($C_r$) 102; an auto-tensioner pulley (A/T) 104; an alternator pulley (ACG) 106 which drives an AC generator; an idler pulley (I/D) 108; a pulley 110 for driving an air compressor (A/C); and a pulley 1 12 for driving a water pump and a fan (WP+Fan). The pulleys 102, 104, 106, 108, 110, 112 are rotatable consecutively about axes 114, 116, 118, 120, 122, 124. A transmission belt 126 is trained around the pulleys 102, 104, 106, 108, 110, 112.

The vibration analysis was performed based upon the layout of the pulleys 102, 104, 106, 108, 110, 112, characteristics of the transmission belt 126, and speed characteristics. The layout of the pulleys 102, 104, 106, 108, 110, 112 is described in Table 1, below.

TABLE 1

| Pulley No. | Pulley Name | Pitch Diameter mm | X-Coordinate | Y-Coordinate | Moment of Inertia $10^{-3}$ kg-m$^2$ | Rated torque kg-m | Span length mm | Contact angle (deg.) | Contact length (mm) |
|---|---|---|---|---|---|---|---|---|---|
| 102 | Cr | 175 | 0 | 0 | — | — | 121.42 | 161.7 | 247.00 |
| 104 | A/T | -100 | -175.0 | 55.0 | 0.2 | 0 | 55.88 | -63.3 | 55.28 |
| 106 | ACG | 65 | -227 | 140 | 4.2 | 0.82 | 76.04 | 171.3 | 97.19 |
| 108 | I/D | -100 | -180 | 230 | 0.2 | 0 | 90.57 | -185.2 | 161.62 |
| 110 | A/C | 130 | -271.2 | 325.2 | 1.5 | 0.73 | 312.42 | 220.0 | 249.56 |
| 112 | WP + FAN | 141 | 0 | 170 | 2 | 0.87 | 169.15 | 55.5 | 68.28 |

In Table 1, the X- and Y-coordinates of the auto-tensioner pulley 104 are not required to be inputted because the coordinates can be found by calculations using the arm parameters.

The characteristics of the transmission belt 126 are shown in Table 2 below.

TABLE 2

| | |
|---|---|
| Number of ribs | 7 |
| Linear density (kg/m/rib) | 0.018 |
| Modulus of elasticity (kgf/m/rib) | 2000 |
| Damping coefficient (Ns/rib) | 20 |
| TSP (N/rib) | 36 |
| Friction coefficient | 0.7 |
| Belt length (mm) | 1704.4 |
| Basic tension (N/one belt) | 600.0 |

The characteristics of the auto-tensioner 128 are shown in Table 3, below.

TABLE 3

| | |
|---|---|
| Center of arm X-coordinate (mm) | −128.4 |
| Center of arm Y-coordinate (mm) | −10 |
| Arm length (mm) | 80 |
| Basic angle (degree) | 125.6 |
| Moment of inertia ($\times 10^{-3}$ kg-m$^2$) | 3.38 |
| Pressing torque (Nm) | 28.7 |
| Damping torque (Nm) | 13.4 |
| Torsional spring constant (Nm/deg) | 0.3 |

An angular velocity/time function of the crankshaft used in this vibration analysis are set forth in Table 4, below.

TABLE 4

| | | | | |
|---|---|---|---|---|
| Number of revolutions (rpm) | 800 | | | |
| Variation period (times/rev.) | 2 | | | |
| Variation rate of revolution (%) | 6 | | | |
| i-th order high frequency | First order | Second order | Third order | Fourth order |
| Single side Amplitude (Ai) | 0.026 | 0.011 | 0.003 | −0.001 |
| Phase (δi)(rad) | −0.484 | 0.25 | 1.246 | −1.527 |

Based upon the above data, an analysis was performed assuming that the divisions of one period was 400 (calculation time interval was 0.094 ms) and a convergence judgment reference (α) was 20N.

Figure 15:
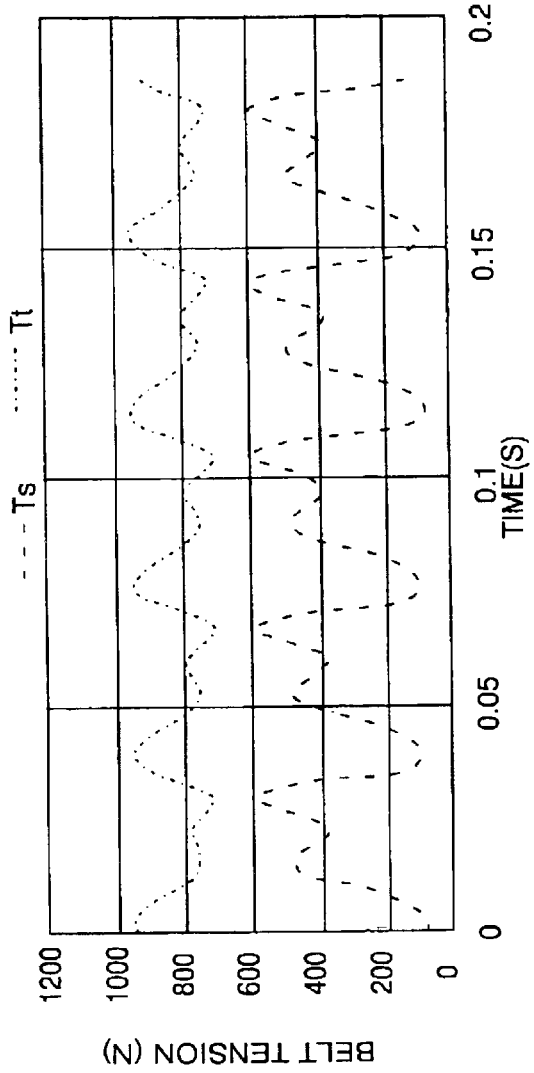
FIG. 15 is a graph showing the results of a simulation using the vibration analysis program with correction of tension.
Figure 16:
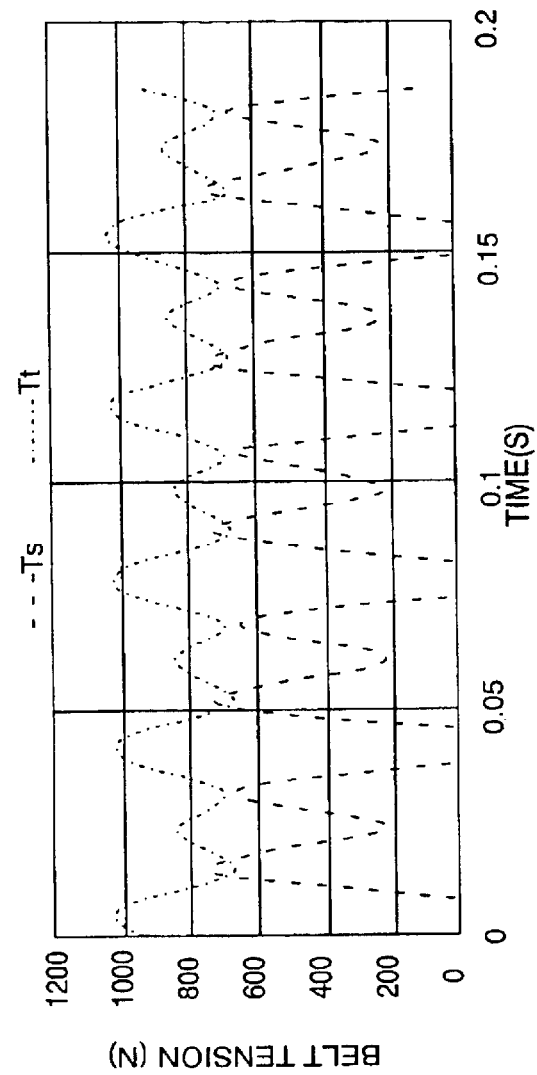
FIG. 16 corresponds to FIG. 15 wherein no correction for tension is made.
Figure 17:
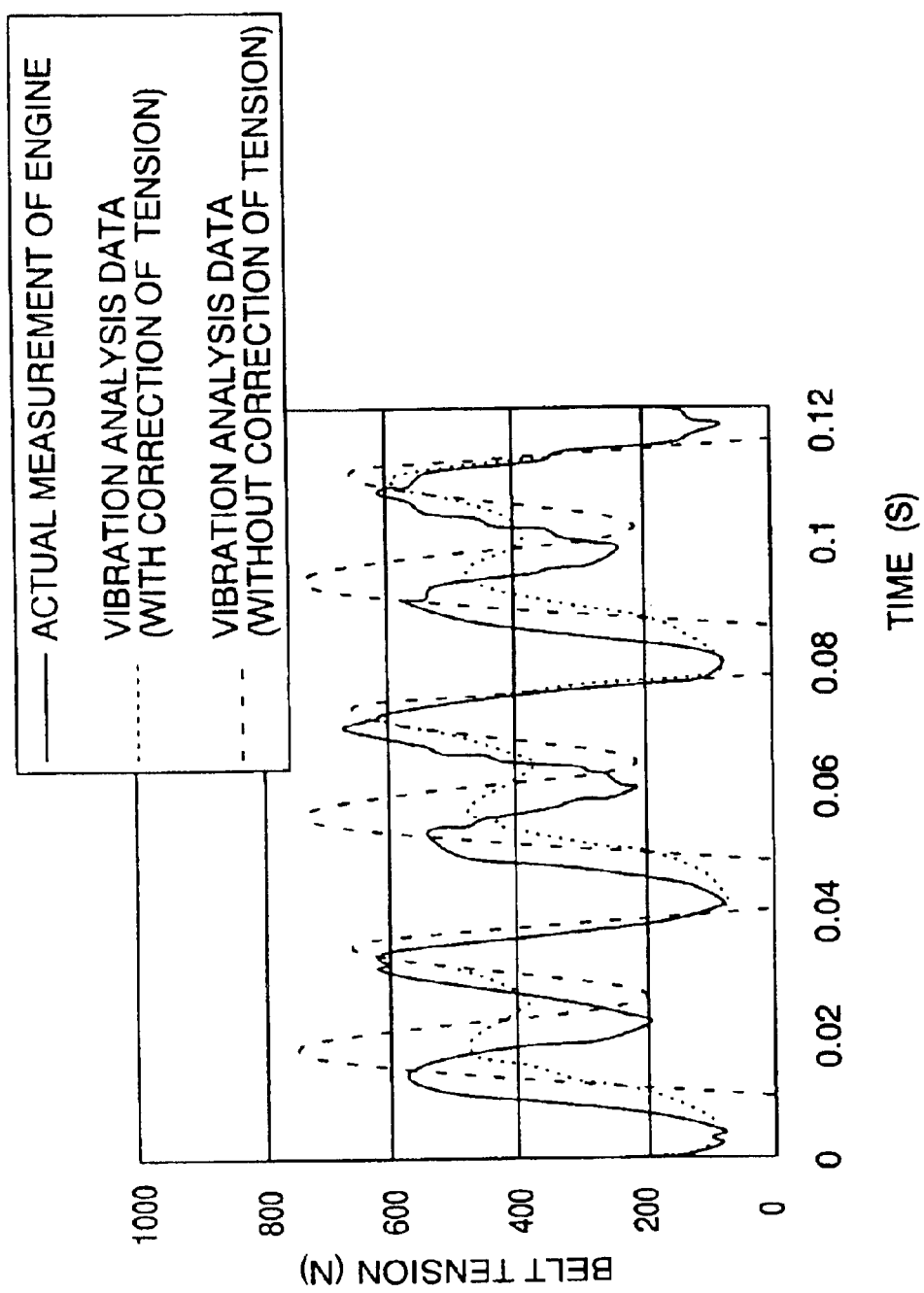
FIG. 17 is a graph comparing: the most slackened side tension with correction of tension; the most slackened side tension without correction of tension; and the most slackened side tension determined through experimental data.

The results of this analysis are shown in FIGS. 15–17. FIG. 15 shows the simulation using the vibration analysis program with tension correction according to the invention. FIG. 16 shows the same simulation without tension correction. FIG. 17 is comparison graph showing the most slackened side tension with correction of tension; the most slackened side tension without correction of tension; and the most slackened side tension determined through experimentation.

In FIGS. 15–17, $T_t$ indicates the tension of the most tensioned span at 130 between the crank pulley 102 and pulley 112. $T_s$ indicates the tension of the transmission belt 126 in the most slackened span of the belt at 132 between the crank pulley 102 and auto-tensioner pulley 104.

Whereas the tension $T_s$ may be negative at times in the vibration analysis program without correction of tension as shown in FIG. 16, the tension $T_s$ never falls to zero or less in the vibration analysis program with correction, as shown in FIG. 15.

In addition, as shown in FIG. 17, with the results at the most slackened span and the actual measurements of an engine compared, it can be seen that the results of the most slackened side tension with correction of tension produces values closer to the actual measurement results of an engine compared with the most slackened side span tension without correction of tension.

Accordingly, since the correction of the span tension according to the present invention is made using concrete results of experimentation, even if compression distortion occurs in a belt span, producing otherwise a negative arithmetic result, a concrete and effective vibration analysis can be performed. In addition, formalization of data input and programming can be performed easily and accurately and, at the same time, the time of arithmetic operation of the program can be effectively controlled.

The foregoing disclosure of specific embodiments is intended to be illustrative of the broad concepts comprehended by the invention.

What is claimed is:

1. A method of analyzing vibration in a longitudinal direction of a transmission belt that is trained around at least a drive pulley and a driven pulley in a power transmission system, the method comprising the steps of:

using a vibration analysis model, said step of using a vibration analysis model comprising: a) generating data relative to the power transmission system; and b) calculating belt tension values including a selected belt tension value using the generated data; and in the event that the selected belt tension value is calculated to be at or lower than a predetermined belt tension value, making a correction in the selected calculated belt tension value, said step of using a vibration analysis model further comprising using the corrected selected calculated belt tension value to carry out vibration analysis.

2. The method of analyzing vibration according to claim 1 wherein the step of using a vibration analysis model comprises modeling belt portions between each of the drive and driven pulleys and a pulley adjacent to each of the drive and driven pulleys using a Voigt model to calculate a belt tension value to be used with the Voigt model from a formula including an harmonic function simulating revolution of a crankshaft for the drive pulley.

3. The method of analyzing vibration according to claim 2 wherein the step of making a correction comprises making a correction using an expression of a curvilinear relation which does not become zero.

4. The method of analyzing vibration according to claim 3 wherein the step of making a correction comprises making a correction using an expression of a curvilinear relation associated by an exponential function.

5. The method of analyzing vibration according to claim 1 wherein the step of making a correction comprises making a correction using the following expression:

$$T' = T_{sp} \times \exp((T/T_{sp}) - 1)$$

where: T is the selected calculated belt tension value;

$T_{sp}$ is the predetermined belt tension value; and

T' is the corrected selected calculated belt tension value.

6. The method of analyzing vibration according to claim 1 wherein the step of calculating the selected belt tension value comprises calculating the selected belt tension value at a belt portion in which there is compression distortion.

7. An apparatus for analyzing vibration in a longitudinal direction of a transmission belt that is trained around at least a drive pulley and a driven pulley in a power transmission system, said apparatus comprising:

first means for receiving data relative to the power transmission system and through the data preparing a vibration analysis using a vibration analysis model, the first means comprising means for calculating belt tension values including a selected belt tension value, the first means further comprising means for making a correction in the selected calculated belt tension value used in preparing the vibration analysis in the event that the selected calculated belt tension value is at or lower than predetermined belt tension value.

8. The apparatus for analyzing vibration according to claim 7 wherein the first means comprises means for modeling belt portions between each of the drive and driven pulleys and a pulley adjacent to each of the drive and driven pulleys using a Voigt model to calculate a belt tension value to be used with the Voigt model from a formula including an harmonic function simulating revolution of a crankshaft for the drive pulley.

9. The apparatus for analyzing vibration according to claim 8 wherein the means for making a correction comprises means for making a correction using an expression of a curvilinear relation which does not become zero.

10. The apparatus for analyzing vibration according to claim 9 wherein the means for making a correction comprises means for making a correction using an expression of a curvilinear relation associated by an exponential function.

11. The apparatus for analyzing vibration according to claim 7 wherein the means for making a correction comprises means for making a correction using the following expression:

$$T' = T_{sp} \times \exp((T/T_{sp}) - 1)$$

where: T is the selected calculated belt tension value;

$T_{sp}$ is the predetermined belt tension value; and

T' is the corrected selected calculated belt tension value.

12. The apparatus for analyzing vibration according to claim 7 wherein the first means comprises means for calculating the selected belt tension value at a belt portion in which there is compression distortion.

13. A program for use with a computer to permit analysis of vibration in a longitudinal direction of a transmission belt that is trained around at least a drive pulley and a driven pulley in a power transmission system, the program when loaded in a computer comprising:

program means for causing the computer to process data relative to the power transmission system and thereby prepare a vibration analysis using a vibration analysis model, the program means comprising means for causing the computer to calculate belt tension values including a selected belt tension value, the program means comprising means for causing the computer to make a correction in the selected calculated belt tension value used in preparing the vibration analysis in the event that the selected calculated belt tension value is at or lower than a predetermined belt tension value.

14. The program for use with a computer according to claim 13 wherein the program means comprises means for causing the computer to model belt portions between each of the drive and driven pulleys and a pulley adjacent to each of the drive and driven pulleys using a Voigt model to calculate a belt tension value to be used with the Voigt model from a formula including an harmonic function simulating revolution of a crankshaft for the drive pulley.

15. The program for use with a computer according to claim 14 wherein the means for causing the computer to make a correction comprises means for causing the computer to make a correction using an expression of a curvilinear relation which does not become zero.

16. The program for use with a computer according to claim 15 wherein the means for causing the computer to make a correction comprises means for causing the computer to make a correction using an expression of a curvilinear selection associated by an exponential function.

17. The program for use with a computer according to claim 13 wherein the means for causing the computer to make a correction comprises means for causing the computer to make a correction using the following expression:

$$T' = T_{sp} \times \exp((T/T_{sp}) - 1)$$

where: T is the selected calculated belt tension value;

$T_{sp}$ is the predetermined belt tension value; and

T' is the corrected calculated selected belt tension value.

18. The program for use with a computer according to claim 13 wherein the program means comprises means for causing the computer to calculate the selected belt tension value at a belt portion in which there is compression distortion.

19. The program for use with a computer according to claim 13 in combination with a computer into which the program is loaded.

* * * * *